US012528853B2

(12) United States Patent
Thomas et al.

(10) Patent No.: US 12,528,853 B2
(45) Date of Patent: Jan. 20, 2026

(54) T-CELL RECEPTOR FOR TREATING FIBROLAMELLAR HEPATOCELLULAR CARCINOMA

(71) Applicants: St. Jude Children's Research Hospital, Inc., Memphis, TN (US); UNIVERSITY OF MARYLAND, BALTIMORE, Baltimore, MD (US)

(72) Inventors: Paul Thomas, Memphis, TN (US); Jeremy Crawford, Memphis, TN (US); Allison Kirk, Memphis, TN (US); Anthony Zamora, Memphis, TN (US); Scott E. Strome, Memphis, TN (US)

(73) Assignees: St. Jude Children's Research Hospital, Inc., Memphis, TN (US); University of Maryland, Baltimore, Baltimore, MD (US)

( * ) Notice: Subject to any disclaimer, the term of this patent is extended or adjusted under 35 U.S.C. 154(b) by 1065 days.

(21) Appl. No.: 17/618,716

(22) PCT Filed: Jun. 19, 2020

(86) PCT No.: PCT/US2020/038626
§ 371 (c)(1),
(2) Date: Dec. 13, 2021

(87) PCT Pub. No.: WO2020/257575
PCT Pub. Date: Dec. 24, 2020

(65) Prior Publication Data

US 2022/0251167 A1 Aug. 11, 2022

Related U.S. Application Data

(60) Provisional application No. 62/864,539, filed on Jun. 21, 2019.

(51) Int. Cl.
*A61P 35/00* (2006.01)
*A61K 39/00* (2006.01)
*C07K 14/725* (2006.01)

(52) U.S. Cl.
CPC .. *C07K 14/7051* (2013.01); *A61K 39/001196* (2018.08); *A61P 35/00* (2018.01); *A61K 2039/844* (2018.08)

(58) Field of Classification Search
CPC ................ C07K 14/7051; C07K 14/47; C07K 2319/00; A61K 39/001196; A61K 2039/844; A61P 35/00; C12N 9/12; C12Y 207/11011
See application file for complete search history.

(56) References Cited

U.S. PATENT DOCUMENTS

2014/0315735 A1 10/2014 Sugiyama
2018/0148690 A1 5/2018 Gros et al.
2019/0095578 A1 3/2019 Shum et al.
2019/0135914 A1 5/2019 Unverdorben et al.

FOREIGN PATENT DOCUMENTS

WO 2015048367 A1 4/2015
WO WO-2019090355 A1 * 5/2019 ........... C07K 14/705

OTHER PUBLICATIONS

Mauro, V.P. Codon Optimization in the Production of Recombinant Biotherapeutics: Potential Risks and Considerations. BioDrugs. 2018 (Year: 2018).*
Synbio Technologies. Vector Atlas. (N.D.) (Year: 2025).*
Graham R.P. et al. DNAJB1-PRKACA is specific for fibrolamellar carcinoma. Mod Pathol. 2015 (Year: 2015).*
Ping Y. et al. T-cell receptor-engineered T cells for cancer treatment: current status and future directions. Protein Cell. 2018. (Year: 2018).*
Cheung, J. et al. (2015) "Structural insights into mis-regulation of protein kinase A in human tumors," Proc. Natl. Acad. Sci. USA 112(5):1374-1379.
Graham, R.P. et al. (2015) "DNAJB1-PRKACA is specific for fibrolamellar carcinoma," Mod. Pathol. 28:822-829.
Honeyman, J.N. et al. (2014)"Detection of a recurrent DNAJB1-PRKACA chimeric transcript in fibrolamellar hepatocellular carcinoma," Science 343:1010-1014.
International Preliminary Report on Patentability in PCT/US2020/038626, dated Dec. 21, 2021.
International Search Report and Written Opinion in PCT/US2020/038626, dated Nov. 20, 2020.
Kastenhuber, E.R. et al. (2017) "DNAJB1-PRKACA fusion kinase interacts with B-catenin and the liver regenerative response to drive fibrolamellar hepatocellular carcinoma," Proc. Natl. Acad. Sci. USA 114 (50):13076-13084.
Turnham, R.E. et al. (2019) "An acquired scaffolding function of the DNAJ-PKAc fusion contributes to oncogenic signaling in fibrolamellar carcinoma," eLife 6:e44187.

* cited by examiner

*Primary Examiner* — Jeffrey Stucker
(74) *Attorney, Agent, or Firm* — Licata & Tyrrell P.C.; Jane Massey Licata

(57) ABSTRACT

A vector harboring nucleic acids encoding a recombinant T cell receptor having antigenic specificity for a DnaJ heat shock protein family member B1-protein kinase cAMP-activated catalytic subunit alpha (DNAJB1-PRKACA) fusion protein is provided, as are host cells and a method for treating fibrolamellar hepatocellular carcinoma with the vector.

7 Claims, 1 Drawing Sheet

Specification includes a Sequence Listing.

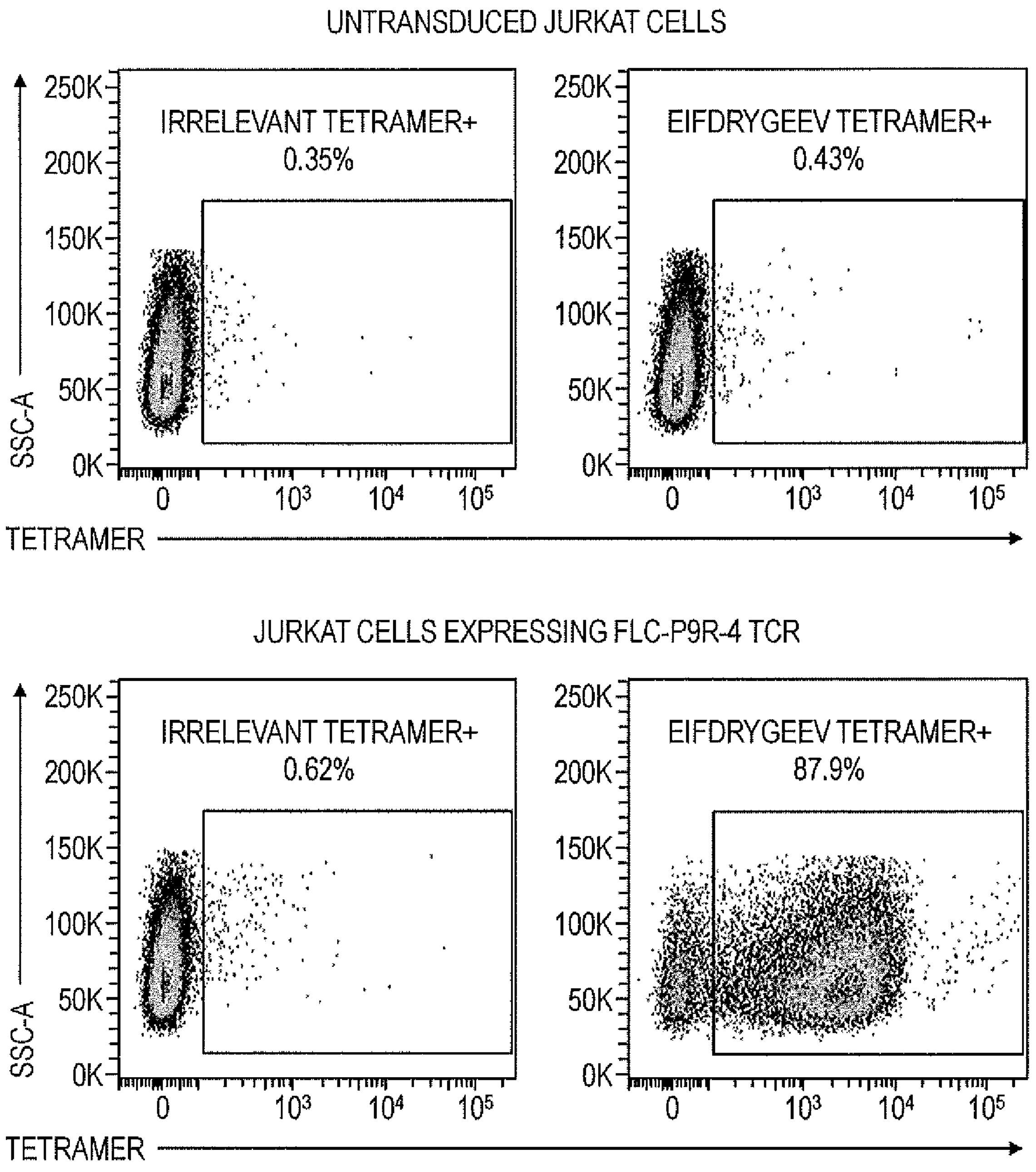
UNTRANSDUCED JURKAT CELLS
IRRELEVANT TETRAMER+
0.35%
EIFDRYGEEV TETRAMER+
0.43%
250K
200K
150K
100K
50K
0K
SSC-A
0
10³
10⁴
10⁵
TETRAMER
JURKAT CELLS EXPRESSING FLC-P9R-4 TCR
IRRELEVANT TETRAMER+
0.62%
EIFDRYGEEV TETRAMER+
87.9%

T-CELL RECEPTOR FOR TREATING FIBROLAMELLAR HEPATOCELLULAR CARCINOMA

INTRODUCTION

This application is a U. S. National Stage Application of PCT/US2020/038626 filed Jun. 19, 2020, which claims benefit of priority from and is a continuation-in-part of U.S. Application Ser. No. 62/864, 539, filed Jun. 21, 2019, the contents of each of which are incorporated herein by reference in their entirety.

This invention was made with government support under grant no. A1136514 awarded by the National Institutes of Health. The government has certain rights in this invention.

BACKGROUND

Human fibrolamellar hepatocellular carcinomas (FLCs) are rare cancers accounting for less than about 5% of all liver cancers and unique in being found primarily in children to young adults without evidence of fibrosis or cirrhosis. FLC ubiquitously harbors an approximately 400-kb deletion on chromosome 19 that produces an in-frame fusion of DnaJ heat shock protein family member B1 (DNAJB1) and protein kinase cAMP-activated catalytic subunit alpha (PRKACA) (Honeyman, et al. (2014) *Science* 343:1010-1014; Graham, et al. (2015) *Mod. Pathol.* 28:822-829). DNAJB1 encodes a subunit of the heat shock factor 48 (HSP40) complex, which activates the ATPase of HSP70 and serves as a molecular chaperone that can be induced by an array of environmental stresses (Priya, et al. (2013) *FEBS Lett* 587:1981-1987). PRKACA encodes a catalytic subunit of protein kinase A (PKA), which resides in the cytoplasm in an inactive tetrameric complex with PKA C-β and two regulatory subunits of the PKA holoenzyme (Turnham & Scott (2016) *Gene* 577:101-108). Activation of G protein-coupled receptors leads to cAMP-dependent activation of the PKA catalytic subunits and subsequent phosphorylation of a panoply of cellular substrates (Turnham & Scott (2016) *Gene* 577:101-108). The crystal structure of the DNAJB1-PRKACA fusion protein shows that the catalytic site, regulatory subunit binding, and anchoring protein binding remain similar to those of the wild-type PRKACA (Cheung, et al. (2015) *Proc. Natl. Acad. Sci. USA* 112:1374-1379).

Beyond the presence of DNAJB1-PRKACA fusions, FLC tumorigenesis is poorly understood. Few, if any, other significantly recurrent mutated genes have been described and while broad copy-number alterations have been observed, they do not specifically implicate known oncogenes or tumor suppressors. Unlike liver cancer in older adults, FLC is not associated with any known etiological risk factors such as alcoholism, chronic hepatitis infection, or liver flukes.

Currently, FLC is diagnosed on the basis of histological features such as large cells with granular eosinophilic cytoplasm, vesiculated nuclei, and large nucleoli. Ultrastructural studies observe a hyperaccumulation of mitochondria and abundant endoplasmic reticulum. While early onset and lack of chronic liver disease are suggestive of FLC, classic hepatocellular carcinoma can also occur in young patients and misdiagnosis is common.

Current treatment of FLC includes aggressive surgical resection and long-term chemotherapy, which eventually fails to control tumor metastasis. In this respect, reported relapse rates can vary between 57% and 100%. Given the low survival rate and lack of available treatment options, there is a pressing need for new therapeutic approaches to treat FLC.

SUMMARY OF THE INVENTION

This invention provides a vector harboring nucleic acids encoding a recombinant T cell receptor having antigenic specificity for a DnaJ heat shock protein family member B1-protein kinase cAMP-activated catalytic subunit alpha (DNAJB1-PRKACA) fusion protein. In one embodiment, the T cell receptor binds amino acid residues EIFDRYGEEV (3 NO:2) of the DNAJB1-PRKACA fusion protein. In another embodiment, the T cell receptor has (i) an α chain variable region comprising the amino acid sequence CALDMFSGGYNKLIF (SEQ ID NO:3), CALSEAEDSGGSNYKLTF (SEQ ID NO:8), CAEGLLSGNTPLVF (SEQ ID NO:9), CAVNILGNKLVF (SEQ ID NO:10), CAVIMDSNYQLIW (SEQ ID NO:11), CASLGVTGGGNKLTF (SEQ ID NO:12), CAAHTGTASKLTF (SEQ ID NO:13), CAVSDDYGGSQGNLIF (SEQ ID NO:14), CAVSRRPGGGNTPLVF (SEQ ID NO:15), or CAVPGNNKFYF (SEQ ID NO:16); (ii) a β chain variable region comprising the amino acid sequence CATSRVKTSGGYEQYF (SEQ ID NO:4), CASSFLGSTDTQYF (SEQ ID NO:17), CASSPGQGSRTEAFF (SEQ ID NO:18), CASSQEGGRLVGTQYF (SEQ ID NO:19), CASSLSLGGRGPDTQYF (SEQ ID NO:20), CASSQDGAGQGYTF (SEQ ID NO:21), CASNPLGGNQPQHF (SEQ ID NO:22), CASSQEVRMNTEAFF (SEQ ID NO:23), CSAKTTGEVPYEQYF (SEQ ID NO:24), or CASSANPTDPVILRYGYTF (SEQ ID NO:25); or (iii) both (i) and (ii). In certain embodiments, the vector is an expression vector. A host cell (e.g., a T cell), a population of host cells, and a pharmaceutical composition are also provided, as is a method of treating or preventing fibrolamellar hepatocellular carcinoma in a mammal using the vector.

BRIEF DESCRIPTION OF THE DRAWINGS

FIG. 1 shows that the TCR of the invention specifically binds the A*68:02-EIFDRYGEEV fusion neopitope. Jurkat cells were engineered to express the FLC-P8R-4 TCR. Subsequently, an A*68:02-EIFDRYGEEV tetramer was used to demonstrate that this TCR specifically binds the A*68:02-EIFDRYGEEV fusion neopitope. Compared to an irrelevant Tetramer and Untransduced Jurkat cells (controls), which show background levels of binding, the results demonstrate that the FLC-P9R-4 TCR binds specifically to the tumor antigen.

DETAILED DESCRIPTION OF THE INVENTION

Isolated T cell receptors (TCR) with antigenic specificity for the DNAJB1-PRKACA fusion protein (SEQ ID NO:1) universally expressed in FLC cells have now been identified. The TCRs recognize a peptide that bridges the oncogenic driver fusion (FIG. 1), specifically EIFDRYGEEV (SEQ ID NO:2), presented on the A*68:02 HLA molecule. An exemplary TCR, JCC209_FLC_TTL4_clonotype4, has an alpha chain variable region with the sequence CALDMFSGGYNKLIF (SEQ ID NO:3), which is thought to have been generated via VDJ recombination of TRAV16*01 and TRAJ4*01, and a beta chain variable region with the sequence CATSRVKTSGGYEQYF (SEQ ID NO:4), which is thought to have been generated via VDJ recombination of TRBV15*01, TRBD2*01, and TRBJ2-7*01. This TCR finds use in TCR-T cell therapy for individuals who have the A*68:02 HLA allele (and all of its sub-variants). In particular, T cells would be engineered to express this TCR and introduced into a patient with FLC to target the patient's cancerous cells. Such treatment may be carried out alone or in conjunction with other therapies including, e.g., surgery, checkpoint blockade, and/or in conjunction with other genetic engineering in the transgenic T cells. Accordingly, this invention provides a vector harboring nucleic acids encoding a recombinant T cell receptor (TCR) having antigenic specificity for the DNAJB1-PRKACA fusion protein, as well as a host cell and method for use of the same in the treatment of FLC.

As is known in the art, "DNAJB1-PRKACA" refers to an in-frame fusion of DNAJB1 and PRKACA. The predominant DNAJB1-PRKACA fusion transcript in subjects with FLC is composed of exon 1 of DNAJB1 exon1 fused to exons 2-10 of PRKACA. The resulting DNAJB1-PRKACA fusion protein has the following amino acid sequence:

```
                                           (SEQ ID NO: 1)
MGKDYYQTLGLARGASDEEIKRAYRRQALRYHPDKNKEPGAEEKFKEIAE

AYDVLSDPRKREIFDRYGEEVKEFLAKAKEDELKKWESPAQNTAHLDQFE

RIKTLGTGSFGRVMINKHKETGNHYAMKILDKQKVVKLKQIEHTLNEKRI

LQAVNFPFLVKLEFSEKDNSNLYMVMEYVPGGEMFSHLRRIGRFSEPHAR

FYAAQIVLTFEYLHSLDLIYRDLKPENLLIDQQGYIQVTDFGFAKRVKGR

TWTLCGTPEYLAPEIILSKGYNKAVDWWALGVLIYEMAAGYPPFFADQPI

QIYEKIVSGKVRFPSHFSSDLKDLLRNlLQVDLTKRFGNlKNGVNDIKNH

KWFATTDWIAIYQRKVEAPFIPKFKGPGDTSNFDDYEEEEIRVSTNEKCG

KEFSEF.
```

This invention provides an isolated or purified TCR having antigenic specificity for the DNAJB1-PRKACA fusion protein. Hereinafter, references to a "TCR" also refer to functional portions and functional variants of the TCR, unless specified otherwise. The inventive TCR may have antigenic specificity for any DNAJB1-PRKACA fusion protein (protein, polypeptide or peptide) including those sharing at least 90%, 91%, 92%, 93%, 94%, 95%, 96%, 97%, 98% or 99% sequence identity with SEQ ID NO:1. In some embodiments, the TCR has antigenic specificity for a DNAJB1-PRKACA peptide having a length of about 8 to 24 amino acid residues, preferably about 9 to about 11 amino acid residues. In certain embodiments, the TCR has antigenic specificity for a DNAJB1-PRKACA peptide having a length of about 8 amino acid residues, about 9 amino acid residues, about 10 amino acid residues, about 11 amino acid residues, about 12 amino acid residues, or about 24 amino acid residues. In particular embodiments, the TCR has antigenic specificity for a DNAJB1-PRKACA peptide, wherein said peptide comprises or consists of the amino acid sequence of EIFDRYGEEV (SEQ ID NO:2).

In some aspects, the inventive TCR recognizes the DNAJB1-PRKACA fusion protein in an HLA-A-dependent manner. "HLA-A-dependent manner," as used herein, means that the TCR elicits an immune response upon binding to the DNAJB1-PRKACA within the context of an HLA-A molecule. The inventive TCR is able to recognize the DNAJB1-PRKACA that is presented by an HLA-A molecule and may bind to the HLA-A molecule in addition to DNAJB1-PRKACA. Exemplary HLA-A molecules in the context of this invention include those encoded by the HLA-A*68:02, HLA-A*23:01, HLA-A*02:01, HLA-A*74:01, HLA-A*32:01, HLA-A*03:01, HLA-A*11:01, HLA-A*25:01, HLA-A*30:02, HLA-A*34:01, HLA-A*36:01 and HLA-A*68:01 alleles, and subvariants thereof. In a preferred embodiment, the TCR recognizes DNAJB1-PRKACA within the context of an HLA-A*68:02 molecule, or a subvariant thereof.

The phrase "antigenic specificity," as used herein, means that the TCR can specifically bind to and immunologically recognize DNAJB1-PRKACA with high avidity. For example, a TCR may be considered to have "antigenic specificity" for DNAJB1-PRKACA if about $1\times10^4$ to about $1\times10^5$ T cells expressing the TCR secrete at least about 200 pg/mL or more (e.g., 200 pg/mL or more, 300 pg/mL or more, 400 pg/mL or more, 500 pg/mL or more, 600 pg/mL or more, 700 pg/mL or more, 1000 pg/mL or more, 5,000 pg/mL or more, 7,000 pg/mL or more, 10,000 pg/mL or more, 20,000 pg/mL or more, or a range defined by any two of the foregoing values) of IFN-γ upon co-culture with (a) antigen-negative HLA-A*68:02 target cells pulsed with a low concentration of a DNAJB1-PRKACA peptide (e.g., about 0.05 ng/mL to about 5 ng/mL, 0.05 ng/mL, 0.1 ng/mL, 0.5 ng/mL, 1 ng/mL, 5 ng/mL, or a range defined by any two of the foregoing values) or (b) antigen-negative HLA-A*68:02 target cells into which a nucleic acid encoding DNAJB1-PRKACA has been introduced such that the target cell expresses DNAJB1-PRKACA. Cells expressing the inventive TCR may also secrete IFN-γ upon co-culture with antigen-negative HLA-A*68:02 target cells pulsed with higher concentrations of DNAJB1-PRKACA peptide.

Alternatively, or in addition to, a TCR may be considered to have "antigenic specificity" for DNAJB1-PRKACA if T cells expressing the TCR secrete at least twice as much IFN-γ upon co-culture with (a) antigen-negative HLA-A*68:02 target cells pulsed with a low concentration of DNAJB1-PRKACA peptide or (b) antigen-negative HLA-A*68:02 target cells into which a nucleic acid encoding DNAJB1-PRKACA has been introduced such that the target cell expresses DNAJB1-PRKACA as compared to the amount of IFN-γ expressed by a negative control. The negative control may be, for example, (i) T cells expressing the TCR, co-cultured with (a) antigen-negative HLA-A*68:02 target cells pulsed with the same concentration of an irrelevant peptide (e.g., some other peptide with a different sequence from the DNAJB1-PRKACA peptide of SEQ ID NO:2) or (b) antigen-negative HLA-A*68:02 target cells into which a nucleic acid encoding an irrelevant peptide has been introduced such that the target cell expresses the irrelevant peptide, or (ii) untransduced T cells (e.g., derived from PBMC, which do not express the TCR) co-cultured with (a) antigen-negative HLA-A*68:02 target cells pulsed with the same concentration of DNAJB1-PRKACA peptide or (b) antigen-negative HLA-A*68:02 target cells into which a nucleic acid encoding DNAJB1-PRKACA has been introduced such that the target cell expresses DNAJB1-PRKACA. IFN-γ secretion may be measured by methods known in the art such as, for example, enzyme-linked immunosorbent assay (ELISA).

Alternatively, or in addition to, a TCR may be considered to have "antigenic specificity" for DNAJB1-PRKACA if at least twice as many of the numbers of T cells expressing the TCR secrete IFN-γ upon co-culture with (a) antigen-negative HLA-A*68:02 target cells pulsed with a low concentration of DNAJB1-PRKACA peptide or (b) antigen-negative HLA-A*68:02 target cells into which a nucleic acid encoding DNAJB1-PRKACA has been introduced such that the target cell expresses DNAJB1-PRKACA as compared to the numbers of negative control T cells that secrete IFN-γ. The concentration of peptide and the negative control may be as described herein. The numbers of cells secreting IFN-γ may be measured by methods known in the art such as, for example, ELISPOT.

The invention provides a TCR having two polypeptides (i.e., polypeptide chains), such as an alpha (α) chain of a TCR, a beta (β) chain of a TCR, a gamma (γ) chain of a TCR, a delta (δ) chain of a TCR, or a combination thereof. The polypeptides of the inventive TCR can include any amino acid sequence, provided that the TCR has antigenic specificity for DNAJB1-PRKACA. In some embodiments, the TCR has an alpha chain variable region and beta chain variable region as set forth in Tables 1 and 2, respectively. In certain embodiments of the invention, the TCR has an α chain of a TCR and a β chain of a TCR. In particular embodiments of the invention, the TCR has an β chain variable region having the amino acid sequence CALDMFSGGYNKLIF (SEQ ID NO:3), CALSEAEDSGGSNYKLTF (SEQ ID NO:8), CAEGLLSGNTPLVF (SEQ ID NO:9), CAVNILGNKLVF (SEQ ID NO:10), CAVIMDSNYQLIW (SEQ ID NO:11), CASLGVTGGGNKLTF (SEQ ID NO:12), CAAHTGTASKLTF (SEQ ID NO:13), CAVSDDYGGSQGNLIF (SEQ ID NO:14), CAVSRRPGGGNTPLVF (SEQ ID NO:15), CAVPGNNKFYF (SEQ ID NO:16); a β chain variable region having the amino acid sequence CATSRVKTSGGYEQYF (SEQ ID NO:4), CASSFLGSTDTQYF (SEQ ID NO:17), CASSPGQGSRTEAFF (SEQ ID NO:18), CASSQEGGRLVGTQYF (SEQ ID NO:19), CASSLSLGGRGPDTQYF (SEQ ID NO:20), CASSQDGAGQGYTF (SEQ ID NO:21), CASNPLGGNQPQHF (SEQ ID NO:22), CASSQEVRMNTEAFF (SEQ ID NO:23), CSAKTTGEVPYEQYF (SEQ ID NO:24), and CASSANPTDPVILRYGYTF (SEQ ID NO:25); or a combination thereof.

The inventive TCRs may further include a constant region. The constant region may be derived from any suitable species such as, e.g., human or mouse. In some embodiments of the invention, the TCRs further include a murine constant region. As used herein, the term "murine" or "human," when referring to a TCR or any component of a TCR described herein (e.g., variable region, constant region, alpha chain and/or beta chain), means a TCR (or component thereof) which is derived from a mouse or a human, respectively, i.e., a TCR (or component thereof) that originated from or was, at one time, expressed by a mouse T cell or a human T cell, respectively. In some embodiments of the invention, the TCR is a chimeric TCR having a human variable region and a murine constant region, wherein the TCR has antigenic specificity for DNAJB1-PRKACA. The chimeric TCR may include the variable regions described herein with respect to other aspects of the invention. In this regard, the chimeric TCR may include the amino acid sequences of SEQ ID NOs:3-4 and/or 8-25. In particular embodiments, the chimeric TCR includes the following combinations of alpha and beta chains: SEQ ID NO:3 and SEQ ID NO:4; SEQ ID NO:8 and SEQ ID NO:17; SEQ ID NO:9 and SEQ ID NO:18; SEQ ID NO:10 and SEQ ID NO:19; SEQ ID NO:11 and SEQ ID NO:20; SEQ ID NO:12 and SEQ ID NO:21; SEQ ID NO:13 and SEQ ID NO:22; SEQ ID NO:14 and SEQ ID NO:23; SEQ ID NO:15 and SEQ ID NO:24; or SEQ ID NO:16 and SEQ ID NO:25.

In some aspects, the TCR includes a substituted constant region. In this regard, the TCR may include one, two, three, or four amino acid substitution(s) in the constant region of one or both of the alpha and beta chain. In some embodiments, a TCR including the substituted constant region advantageously provides one or more of increased recognition of DNAJB1-PRKACA, increased expression by a host cell, and increased anti-tumor activity as compared to the parent TCR having an unsubstituted (wild-type) constant region. Exemplary amino acid substitutions are disclosed, e.g., in US 2019/0040111.

In some embodiments of the invention, the TCR includes a full-length alpha chain and a full-length beta chain. In other embodiments, one or both the alpha chain and beta chain of the TCR are less than full-length. In further embodiments, the TCR includes substitutions of one, two, or three amino acids in the transmembrane (TM) domain of the constant region of one or both of the α and β chains with a hydrophobic amino acid to provide a hydrophobic amino acid-substituted TCR. The hydrophobic amino acid substitution(s) in the TM domain of the TCR may increase the hydrophobicity of the TM domain of the TCR as compared to a TCR that lacks the hydrophobic amino acid substitution (s) in the TM domain.

Included in the scope of the invention are functional variants of the inventive TCRs described herein. The term "functional variant," as used herein, refers to a TCR polypeptide or protein having substantial or significant sequence identity or similarity to a parent TCR polypeptide or protein, wherein the functional variant retains the biological activity of the TCR polypeptide, or protein of which it is a variant. Functional variants encompass, for example, those variants of the TCR polypeptide or protein described herein (the parent TCR polypeptide or protein) that retain the ability to specifically bind to DNAJB1-PRKACA for which the parent TCR has antigenic specificity or to which the parent polypeptide or protein specifically binds, to a similar extent, the same extent, or to a higher extent, as the parent TCR polypeptide or protein. In reference to the parent TCR polypeptide or protein, the functional variant can, for instance, be at least about 30%, 50%, 75%, 80%, 90%, 95%, 96%, 97%, 98%, 99% or more identical in amino acid sequence to the parent TCR polypeptide or protein.

The functional variant can, for example, include the amino acid sequence of the parent TCR polypeptide or protein with at least one conservative amino acid substitution. Conservative amino acid substitutions are known in the art, and include amino acid substitutions in which one amino acid having certain physical and/or chemical properties is exchanged for another amino acid that has the same chemical or physical properties. For instance, the conservative amino acid substitution can be an acidic amino acid substituted for another acidic amino acid (e.g., Asp or Glu), an amino acid with a nonpolar side chain substituted for another amino acid with a nonpolar side chain (e.g., Ala, Gly, Val, Ile, Leu, Met, Phe, Pro, Trp, Val, etc.), a basic amino acid substituted for another basic amino acid (Lys, Arg, etc.), an amino acid with a polar side chain substituted for another amino acid with a polar side chain (Asn, Cys, Gln, Ser, Thr, Tyr, etc.), etc.

Alternatively, or in addition to, the functional variants can include the amino acid sequence of the parent TCR polypeptide or protein with at least one non-conservative amino acid substitution. In this case, it is preferable for the non-conservative amino acid substitution to not interfere with or inhibit the biological activity of the functional variant. Preferably, the non-conservative amino acid substitution enhances the biological activity of the functional variant, such that the biological activity of the functional variant is increased as compared to the parent TCR polypeptide or protein.

Also provided by the invention is a polypeptide including a functional portion of any of the TCRs described herein. The term "polypeptide" or "protein," as used herein, includes oligopeptides and refers to a single chain of amino acids connected by one or more peptide bonds. With respect to the inventive polypeptides, the functional portion can be any portion including contiguous amino acids of the TCR of which it is a part, provided that the functional portion specifically binds to DNAJB1-PRKACA. The term "functional portion," when used in reference to a TCR, refers to any part or fragment of the TCR of the invention, which part or fragment retains the biological activity of the TCR of which it is a part (the parent TCR). Functional portions encompass, for example, those parts of a TCR that retain the ability to specifically bind to DNAJB1-PRKACA (e.g., in an HLA-A*68:02-dependent manner), or detect, treat, or prevent FLC, to a similar extent, the same extent, or to a higher extent, as the parent TCR. In reference to the parent TCR, the functional portion can include, for instance, about 10%, 25%, 30%, 50%, 68%, 80%, 90%, 95%, or more, of the parent TCR.

The functional portion can include additional amino acids at the amino- or carboxy-terminus of the portion, or at both termini, which additional amino acids are not found in the amino acid sequence of the parent TCR. Desirably, the additional amino acids do not interfere with the biological function of the functional portion, e.g., specifically binding to DNAJB1-PRKACA; and/or having the ability to detect FLC, treat or prevent FLC, etc. More desirably, the additional amino acids enhance the biological activity, as compared to the biological activity of the parent TCR.

The polypeptide can include a functional portion of either or both of the α and β chains of the TCRs of the invention, such as a functional portion comprising one or both of the variable region(s) of the α chain and/or β chain of a TCR of the invention. Preferably, the inventive polypeptide includes a functional portion comprising the amino acid sequences of SEQ ID NOs:3-4 and/or 8-25.

In some embodiments, the TCR of the invention may be a fusion protein. In this regard, the invention also provides a fusion protein including at least one of the inventive polypeptides described herein along with at least one other polypeptide. The other polypeptide can exist as a separate polypeptide of the fusion protein, or can exist as a polypeptide, which is expressed in frame (in tandem) with one of the inventive polypeptides described herein. The other polypeptide can encode any peptidic or proteinaceous molecule, or a portion thereof, including, but not limited to an immunoglobulin, CD3, CD4, CD8, an MHC molecule, a CD1 molecule, e.g., CD1a, CD1b, CD1c, CD1d, etc. The fusion protein can include one or more copies of the inventive polypeptide and/or one or more copies of the other polypeptide. For instance, the fusion protein can include 1, 2, 3, 4, 5, or more, copies of the inventive polypeptide and/or of the other polypeptide. Suitable methods of making fusion proteins are known in the art, and include, for example, recombinant methods.

In some embodiments of the invention, the TCR protein of the invention may be expressed as a single protein including a linker peptide linking the β chain and the β chain (Vα-linker-Vβ or Vβ-linker-Vα). In this regard, the TCR protein of the invention may further comprise a linker peptide. The linker peptide may advantageously facilitate the expression of a recombinant TCR protein in a host cell. The linker peptide may have any suitable amino acid sequence. For example, the linker peptide may include a Glycine/Serine-rich linker of 15-20 amino acids in length (see, e.g., Knies, et al. (2016) *Oncotarget* 7(16):21199-21221); the sequence KLSGSASAPKLEEGEFSEARV (SEQ ID NO:5; Gunnarsen, et al. (2013) *Sci. Rep.* 3:1162; the sequence RAKRSGSGATNFSLLKQAGDVEENPGP (SEQ ID NO:6; US 2019/0040111); or the sequence GSADDAKKDAAKKDGK (SEQ ID NO:7; WO 2011/044186). Upon expression of the construct including the linker peptide by a host cell, the linker peptide may be cleaved, resulting in separated α and β chains. In one embodiment of the invention, the TCR protein may include an amino acid sequence comprising a full-length β chain, a full-length β chain, and a linker peptide positioned between the α and β chains.

The TCR protein of the invention may also include synthetic amino acids in place of one or more naturally-occurring amino acids. Such synthetic amino acids are known in the art, and include, for example, aminocyclohexane carboxylic acid, norleucine, α-amino n-decanoic acid, homoserine, S-acetylaminomethyl-cysteine, trans-3- and trans-4-hydroxyproline, 4-aminophenylalanine, 4-nitrophenylalanine, 4-chlorophenylalanine, 4-carboxyphenylalanine, β-phenylserine β-hydroxyphenylalanine, phenylglycine, α-naphthylalanine, cyclohexylalanine, cyclohexylglycine, indoline-2-carboxylic acid, 1,2,3,4-tetrahydroisoquinoline-3-carboxylic acid, aminomalonic acid, aminomalonic acid monoamide, N'-benzyl-N'-methyl-lysine, N',N'-dibenzyl-lysine, 6-hydroxylysine, ornithine, α-aminocyclopentane carboxylic acid, α-aminocyclohexane carboxylic acid, α-aminocycloheptane carboxylic acid, α-(2-amino-2-norbornane)-carboxylic acid, α,γ-diaminobutyric acid, α,β-diaminopropionic acid, homophenylalanine, and α-tert-butylglycine.

The TCR protein of the invention can be glycosylated, amidated, carboxylated, phosphorylated, esterified, N-acylated, cyclized via, e.g., a disulfide bridge, or converted into an acid addition salt and/or optionally dimerized or polymerized, or conjugated.

The TCR protein can be produced using standard recombinant methods. See, for instance, Green & Sambrook, *Molecular Cloning: A Laboratory Manual,* 4th ed., Cold Spring Harbor Press, Cold Spring Harbor, N.Y. (2012). In this respect, a nucleic acid encoding the TCR protein described herein is inserted or cloned into a vector, preferably an expression vector, which is introduced into a host cell, and the recombinant TCR protein is expressed by the host cell. "Nucleic acid," as used herein, includes "polynucleotide," "oligonucleotide," and "nucleic acid molecule," and generally means a polymer of DNA or RNA, which can be single-stranded or double-stranded, which can contain natural, non-natural or altered nucleotides, and which can contain a natural, non-natural or altered internucleotide linkage, such as a phosphoroamidate linkage or a phosphorothioate linkage, instead of the phosphodiester found between the nucleotides of an unmodified oligonucleotide. In an embodiment, the nucleic acid comprises complementary DNA (cDNA). It is generally preferred that the nucleic acid does not include any insertions, deletions, inversions, and/or substitutions. However, it may be suitable in some instances, as discussed herein, for the nucleic acid to include one or more insertions, deletions, inversions, and/or substitutions.

Preferably, the nucleic acids of the invention are recombinant. As used herein, the term "recombinant" refers to (i) molecules that are constructed outside living cells by joining natural or synthetic nucleic acid segments to nucleic acid molecules that can replicate in a living cell, or (ii) molecules that result from the replication of those described in (i)

above. For purposes herein, the replication can be in vitro replication or in vivo replication.

The nucleic acids can be constructed based on chemical synthesis and/or enzymatic ligation reactions using procedures known in the art. See, for example, Green & Sambrook et al., supra. For example, a nucleic acid can be chemically synthesized using naturally occurring nucleotides or variously modified nucleotides designed to increase the biological stability of the molecules or to increase the physical stability of the duplex formed upon hybridization (e.g., phosphorothioate derivatives and acridine substituted nucleotides). Examples of modified nucleotides that can be used to generate the nucleic acids include, but are not limited to, 5-fluorouracil, 5-bromouracil, 5-chlorouracil, 5-iodouracil, hypoxanthine, xanthine, 4-acetylcytosine, 5-(carboxyhydroxymethyl) uracil, 5-carboxymethylaminomethyl-2-thiouridine, 5-carboxymethylaminomethyluracil, dihydrouracil, inosine, $N^6$-isopentenyladenine, 1-methylguanine, 1-methylinosine, 2,2-dimethylguanine, 2-methyladenine, 2-methylguanine, 3-methylcytosine, 5-methylcytosine, $N^6$-substituted adenine, 7-methylguanine, 5-methylaminomethyluracil, 5-methoxyaminomethyl-2-thiouracil, 5'-methoxycarboxymethyluracil, 5-methoxyuracil, 2-methylthio-$N^6$-isopentenyladenine, uracil-5-oxyacetic acid (v), pseudouracil, 2-thiocytosine, 5-methyl-2-thiouracil, 2-thiouracil, 4-thiouracil, 5-methyluracil, uracil-5-oxyacetic acid methylester, 3-(3-amino-3-N-2-carboxypropyl) uracil, and 2,6-diaminopurine. Alternatively, one or more of the nucleic acids of the invention can be purchased from companies, such as Macromolecular Resources (Fort Collins, Colo.) and Synthegen (Houston, Tex.).

The nucleic acids can include any nucleotide sequence which encodes the TCR protein described herein. In one embodiment of the invention, the nucleic acid encodes the protein sequence of SEQ ID NO:3, SEQ ID NO:8, SEQ ID NO:9, SEQ ID NO:10, SEQ ID NO:11, SEQ ID NO:12, SEQ ID NO:13, SEQ ID NO:14, SEQ ID NO:15, or SEQ ID NO:16 (variable region of alpha chain) in combination with the protein sequence of SEQ ID NO:4, SEQ ID NO:17, SEQ ID NO:18, SEQ ID NO:19, SEQ ID NO:20, SEQ ID NO:21, SEQ ID NO:22, SEQ ID NO:23, SEQ ID NO:24, or SEQ ID NO:25 (variable region of beta chain).

In some embodiments, the nucleic acids include a codon-optimized nucleotide sequence encoding the TCR protein described herein. Without being bound to any particular theory or mechanism, it is believed that codon optimization of the nucleotide sequence increases the translation efficiency of the mRNA transcripts. Codon optimization of the nucleotide sequence may involve substituting a native codon for another codon that encodes the same amino acid, but can be translated by tRNA that is more readily available within a cell, thus increasing translation efficiency. Optimization of the nucleotide sequence may also reduce secondary mRNA structures that would interfere with translation, thus increasing translation efficiency.

The invention also provides a nucleic acid having a nucleotide sequence which is complementary to the nucleotide sequence of the nucleic acids described herein or a nucleotide sequence which hybridizes under stringent conditions to the nucleotide sequence of the nucleic acids described herein. The nucleotide sequence which hybridizes under stringent conditions preferably hybridizes under high stringency conditions. By "high stringency conditions" is meant that the nucleotide sequence specifically hybridizes to a target sequence (the nucleotide sequence of any of the nucleic acids described herein) in an amount that is detectably stronger than non-specific hybridization. High stringency conditions include conditions which would distinguish a polynucleotide with an exact complementary sequence, or one containing only a few scattered mismatches from a random sequence that happened to have a few small regions (e.g., 3-10 bases) that matched the nucleotide sequence. Such small regions of complementarity are more easily melted than a full-length complement of 14-17 or more bases, and high stringency hybridization makes them easily distinguishable. Relatively high stringency conditions would include, for example, low salt and/or high temperature conditions, such as provided by about 0.02-0.1 M NaCl or the equivalent, at temperatures of about 50-70° C. Such high stringency conditions tolerate little, if any, mismatch between the nucleotide sequence and the template or target strand, and are particularly suitable for detecting expression of any of the inventive TCRs. It is generally appreciated that conditions can be rendered more stringent by the addition of increasing amounts of formamide.

The invention also provides a nucleic acid having a nucleotide sequence that is at least about 70% or more, e.g., about 80%, about 90%, about 91%, about 92%, about 93%, about 94%, about 95%, about 96%, about 97%, about 98%, or about 99% identical to a nucleic acid encoding a TCR protein describe herein. In this regard, the nucleic acid may consist essentially of any of the nucleotide sequences described herein.

Ideally, the nucleic acids of the invention are incorporated into a vector, preferably an expression vector. In this regard, the invention provides a vector harboring nucleic acids encoding a recombinant T cell receptor having antigenic specificity for a DNAJB1-PRKACA fusion protein. In one embodiment of the invention, the vector, preferably an expression vector, comprises a nucleotide sequence encoding the α chain, the β chain, and linker peptide.

For the purposes herein, the term "expression vector" means a genetically-modified oligonucleotide or polynucleotide construct that permits the expression of an mRNA, protein, polypeptide, or peptide by a host cell, when the construct includes a nucleotide sequence encoding the mRNA, protein, polypeptide, or peptide, and the vector is contacted with the cell under conditions sufficient to have the mRNA, protein, polypeptide, or peptide expressed within the cell. The vectors of the invention are not naturally-occurring as a whole. However, parts of the vectors can be naturally-occurring. The inventive expression vectors can include any type of nucleotide, including, but not limited to DNA and RNA, which can be single-stranded or double-stranded, synthesized or obtained in part from natural sources, and which can contain natural, non-natural or altered nucleotides. The expression vectors can include naturally-occurring, non-naturally-occurring internucleotide linkages, or both types of linkages. Preferably, the non-naturally occurring or altered nucleotides or internucleotide linkages do not hinder the transcription or replication of the vector.

The expression vector of the invention can be any suitable expression vector, and can be used to transform or transfect any suitable host cell. Suitable vectors include those designed for propagation and expansion or for expression or both, such as plasmids and viruses. The vector can be selected from the group of the pUC series (Fennentas Life Sciences), the pBluescript series (Stratagene, LaJolla, Calif.), the pET series (Novagen, Madison, Wis.), the pGEX series (Pharmacia Biotech, Uppsala, Sweden), and the pEX series (Clontech, Palo Alto, Calif.). Bacteriophage vectors, such as λGT10, λGT11, λZapII (Stratagene), λEMBL4, and λNM1149, also can be used. Examples of plant expression vectors include pBI01, pBI101.2, pBI101.3, pBI121 and pBIN19 (Clontech). Examples of animal expression vectors include pEUK-Cl, pMAM and pMAMneo (Clontech). Preferably, the expression vector is a viral vector, e.g., a retroviral vector. In a particular embodiment, the expression vector is an MSGV1 vector.

The vectors of the invention can be prepared using standard recombinant DNA techniques described in, for example, Green & Sambrook et al., supra. Constructs of vectors, which are circular or linear, can be prepared to contain a replication system functional in a prokaryotic or eukaryotic host cell. Replication systems can be derived, e.g., from ColEl, 2μ plasmid, λ, SV40, bovine papillomavirus, and the like.

Desirably, the expression vector includes regulatory sequences, such as transcription and translation initiation and termination codons, which are specific to the type of host cell (e.g., bacterium, fungus, plant, or animal) into which the vector is to be introduced, as appropriate and taking into consideration whether the vector is DNA- or RNA-based.

The vectors can include one or more marker genes, which allow for selection of transformed or transfected host cells. Marker genes include biocide resistance, e.g., resistance to antibiotics, heavy metals, etc., complementation in an auxotrophic host cell to provide prototrophy, and the like. Suitable marker genes for the inventive vectors include, for instance, neomycin/G418 resistance genes, hygromycin resistance genes, histidinol resistance genes, tetracycline resistance genes, and ampicillin resistance genes.

The expression vector can include a native or non-native promoter operably linked to the nucleotide sequence encoding the TCR protein, or to the nucleotide sequence which is complementary to or which hybridizes to the nucleotide sequence encoding the TCR protein. The selection of promoters, e.g., strong, weak, inducible, tissue-specific and developmental-specific, is within the ordinary skill of the artisan. Similarly, the combining of a nucleotide sequence with a promoter is also within the skill of the artisan. The promoter can be a non-viral promoter or a viral promoter, e.g., a cytomegalovirus (CMV) promoter, an SV40 promoter, an RSV promoter, and a promoter found in the long-terminal repeat of the murine stem cell virus.

The inventive expression vectors can be designed for either transient expression, for stable expression, or for both. Also, the expression vectors can be made for constitutive expression or for inducible expression.

Further, the expression vectors can be made to include a suicide gene. As used herein, the term "suicide gene" refers to a gene that causes the cell expressing the suicide gene to die. The suicide gene can be a gene that confers sensitivity to an agent, e.g., a drug, upon the cell in which the gene is expressed, and causes the cell to die when the cell is contacted with or exposed to the agent. Suicide genes are known in the art and include, for example, the Herpes Simplex Virus (HSV) thymidine kinase (TK) gene, cytosine deaminase, purine nucleoside phosphorylase, and nitroreductase.

Another embodiment of the invention further provides a host cell including a vector described herein. As used herein, the term "host cell" refers to any type of cell that can contain the inventive vector. The host cell can be a eukaryotic cell, e.g., plant, animal, fungi, or algae, or can be a prokaryotic cell, e.g., bacteria or protozoa. The host cell can be a cultured cell or a primary cell, i.e., isolated directly from an organism, e.g., a human. The host cell can be an adherent cell or a suspended cell, i.e., a cell that grows in suspension. Suitable host cells are known in the art and include, for instance, DH5a *E. coli* cells, Chinese hamster ovarian cells, monkey VERO cells, COS cells, HEK293 cells, and the like. For purposes of amplifying or replicating the vector, the host cell is preferably a prokaryotic cell, e.g., a DH5a cell. For purposes of producing a recombinant TCR protein, the host cell is preferably a mammalian cell. Most preferably, the host cell is a human cell. While the host cell can be of any cell type, can originate from any type of tissue, and can be of any developmental stage, the host cell preferably is a peripheral blood lymphocyte (PBL) or a peripheral blood mononuclear cell (PBMC). More preferably, the host cell is a T cell.

For purposes herein, the T cell can be any T cell, such as a cultured T cell, e.g., a primary T cell, or a T cell from a cultured T cell line, e.g., Jurkat, SupT1, etc., or a T cell obtained from a mammal. If obtained from a mammal, the T cell can be obtained from numerous sources, including but not limited to blood, bone marrow, lymph node, the thymus, or other tissues or fluids. T cells can also be enriched for or purified. Preferably, the T cell is a human T cell. The T cell can be any type of T cell and can be of any developmental stage, including but not limited to, $CD4^+/CD8^+$ double positive T cells, $CD4^+$ helper T cells, e.g., $Th_1$ and $Th_2$ cells, $CD4^+$ T cells, $CD8^+$ T cells (e.g., cytotoxic T cells), tumor infiltrating lymphocytes (TILs), memory T cells (e.g., central memory T cells and effector memory T cells), naïve T cells, and the like.

Also provided by the invention is a population of cells, which includes at least one host cell described herein. The population of cells can be a heterogeneous population including the host cell harboring the expression vector of the invention, in addition to at least one other cell, e.g., a host cell (e.g., a T cell), which does not include the expression vector, or a cell other than a T cell, e.g., a B cell, a macrophage, a neutrophil, an erythrocyte, a hepatocyte, an endothelial cell, an epithelial cells, a muscle cell, a brain cell, etc. Alternatively, the population of cells can be a substantially homogeneous population, in which the population is composed mainly of host cells (e.g., consisting essentially of) harboring the expression vector. The population also can be a clonal population of cells, in which all cells of the population are clones of a single host cell harboring the expression vector, such that all cells of the population harbor the expression vector. In one embodiment of the invention, the population of cells is a clonal population composed of host cells harboring the expression vector as described herein.

In some embodiments, the numbers of cells in the population may be rapidly expanded. Expansion of the numbers of T cells can be accomplished by any of a number of methods as are known in the art as described in, for example, U.S. Pat. Nos. 8,034,334; 8,383,099; US 2012/0244133; Dudley, et al. (2003) *J. Immunother.* 26:332-42; and Riddell, et al. (1990) *J. Immunol. Methods* 128:189-201. In an embodiment, expansion of the numbers of T cells is carried out by culturing the T cells with OKT3 antibody, IL-2, and feeder PBMC (e.g., irradiated allogeneic PBMC).

The inventive TCR protein, nucleic acids, expression vectors, and host cells (including populations thereof), can be isolated and/or purified. The term "isolated" as used herein means having been removed from its natural environment. The term "purified" as used herein means having been increased in purity, wherein "purity" is a relative term, and not to be necessarily construed as absolute purity. For example, the purity can be at least about 50%, can be greater than 60%, 70%, 80%, 90%, 95%, or can be 100%.

The inventive TCR proteins, nucleic acids, expression vectors, and host cells (including populations thereof), all of which are collectively referred to as "inventive TCR materials" hereinafter, can be formulated into a composition, such as a pharmaceutical composition. In this regard, the invention provides a pharmaceutical composition including any of the TCR proteins, nucleic acids, expression vectors, and host cells (including populations thereof), described herein, and a pharmaceutically acceptable carrier. The inventive pharmaceutical compositions containing any of the inventive TCR materials can include more than one inventive TCR material, e.g., a polypeptide and a nucleic acid, or two or more different TCRs. Alternatively, the pharmaceutical composition can include an inventive TCR material in combination with another pharmaceutically active agent(s) or drug(s), such as a chemotherapeutic agent, e.g., asparaginase, busulfan, carboplatin, cisplatin, daunorubicin, doxorubicin, fluorouracil, gemcitabine, hydroxyurea, methotrexate, paclitaxel, rituximab, vinblastine, vincristine, etc.

Preferably, the carrier is a pharmaceutically acceptable carrier. With respect to pharmaceutical compositions, the carrier can be any of those conventionally used for the particular inventive TCR material under consideration. Methods for preparing administrable compositions are known or apparent to those skilled in the art and are described in more detail in, for example, *Remington: The Science and Practice of Pharmacy,* $22^{nd}$ Ed., Pharmaceutical Press (2012). It is preferred that the pharmaceutically acceptable carrier be one which has no detrimental side effects or toxicity under the conditions of use.

The choice of carrier will be determined in part by the particular inventive TCR material, as well as by the particular method used to administer the inventive TCR material. Accordingly, there are a variety of suitable formulations of the pharmaceutical composition of the invention. Suitable formulations may include any of those for parenteral, subcutaneous, intravenous, intramuscular, intraarterial, intrathecal, intratumoral, or interperitoneal administration. More than one route can be used to administer the inventive TCR materials, and in certain instances, a particular route can provide a more immediate and more effective response than another route.

Preferably, the inventive TCR material is administered by injection, e.g., intravenously. When the inventive TCR material is a host cell expressing the inventive TCR, the pharmaceutically acceptable carrier for the cells for injection may include any isotonic carrier such as, for example, normal saline (about 0.90% w/v of NaCl in water, about 300 mOsm/L NaCl in water, or about 9.0 g NaCl per liter of water), an electrolyte solution sold under the trademark NORMOSOL® R (Abbott, Chicago, IL) or PLASMA-LYTE A (Baxter, Deerfield, IL), about 5% dextrose in water, or Ringer's lactate. In an embodiment, the pharmaceutically acceptable carrier is supplemented with human serum albumen.

For purposes of the invention, the amount or dose (e.g., numbers of cells when the inventive TCR material is one or more cells) of the inventive TCR material administered should be sufficient to effect, e.g., a therapeutic or prophylactic response, in the subject or animal over a reasonable time frame. For example, the dose of the inventive TCR material should be sufficient to bind to a cancer antigen (e.g., DNAJB1-PRKACA), or detect, treat or prevent cancer in a period of from about 2 hours or longer, e.g., 12 to 24 or more hours, from the time of administration. In certain embodiments, the time period could be even longer. The dose will be determined by the efficacy of the particular inventive TCR material and the condition of the animal (e.g., human), as well as the body weight of the animal (e.g., human) to be treated.

Many assays for determining an administered dose are known in the art. For purposes of the invention, an assay, which includes comparing the extent to which target cells are lysed or IFN-γ is secreted by T cells expressing the inventive TCR, polypeptide, or protein upon administration of a given dose of such T cells to a mammal among a set of mammals of which each is given a different dose of the T cells, could be used to determine a starting dose to be administered to a mammal. The extent to which target cells are lysed or IFN-γ is secreted upon administration of a certain dose can be assayed by methods known in the art.

The dose of the inventive TCR material also will be determined by the existence, nature and extent of any adverse side effects that might accompany the administration of a particular inventive TCR material. Typically, the attending physician will decide the dosage of the inventive TCR material with which to treat each individual patient, taking into consideration a variety of factors, such as age, body weight, general health, diet, sex, inventive TCR material to be administered, route of administration, and the severity of the cancer being treated. In an embodiment in which the inventive TCR material is a population of cells, the number of cells administered per infusion may vary, e.g., from about $1\times10^6$ to about $1\times10^2$ cells or more. In certain embodiments, fewer than $1\times10^6$ cells may be administered.

One of ordinary skill in the art will readily appreciate that the inventive TCR materials of the invention can be modified in any number of ways, such that the therapeutic or prophylactic efficacy of the inventive TCR materials is increased through the modification. For instance, the inventive TCR materials can be conjugated either directly or indirectly through a bridge to a chemotherapeutic agent. The practice of conjugating compounds to a chemotherapeutic agent is known in the art. One of ordinary skill in the art recognizes that sites on the inventive TCR materials, which are not necessary for the function of the inventive TCR materials, are ideal sites for attaching a bridge and/or a chemotherapeutic agent, provided that the bridge and/or chemotherapeutic agent, once attached to the inventive TCR materials, do(es) not interfere with the function of the inventive TCR materials, i.e., the ability to bind to DNAJB1-PRKACA or to detect, treat, or prevent cancer.

It is contemplated that the inventive pharmaceutical compositions, TCR proteins, nucleic acids, expression vectors, host cells, or populations of cells can be used in methods of treating or preventing fibrolamellar hepatocellular carcinoma. Without being bound to a particular theory, the inventive TCR is believed to bind specifically to DNAJB1-PRKACA, such that the TCR, when expressed by a cell, is able to mediate an immune response against a target cell expressing DNAJB1-PRKACA. In this regard, the invention provides a method of treating or preventing FLC in a mammal by administering to the mammal any of the pharmaceutical compositions, TCR proteins described herein, any nucleic acid or expression vector harboring a nucleic acid encoding the TCR proteins described herein, or any host cell or population of cells having an expression vector which encodes the TCR proteins described herein, in an amount effective to treat or prevent FLC in the mammal.

The terms "treat" and "prevent" as well as words stemming therefrom, as used herein, do not necessarily imply 100% or complete treatment or prevention. Rather, there are varying degrees of treatment or prevention of which one of ordinary skill in the art recognizes as having a potential benefit or therapeutic effect. In this respect, the inventive methods can provide any amount of any level of treatment or prevention of PLC in a mammal. Furthermore, the treatment or prevention provided by the inventive method can include treatment or prevention of one or more conditions or symptoms of FLC. For example, treatment or prevention can include promoting cancer regression. Also, for purposes herein, "prevention" can encompass delaying the onset of FLC, or a symptom or condition thereof. Alternatively, or in addition to, "prevention" may encompass preventing or delaying the recurrence of FLC, or a symptom or condition thereof.

For purposes of the inventive methods, wherein host cells or populations of cells are administered, the cells can be cells that are allogeneic or autologous to the mammal. Preferably, the cells are autologous to the mammal.

The mammal referred to in the inventive methods can be any mammal. As used herein, the term "mammal" refers to any mammal, including, but not limited to, mammals of the order Rodentia, such as mice and hamsters. It is preferred that the mammals are of the order Primates, Ceboids, or Simoids (monkeys) or of the order Anthropoids (humans and apes). An especially preferred mammal is the human. Ideally, the mammal being treated has the A*68:02 HLA allele, or a sub-variant thereof.

As indicated, treatment of a mammal with a TCR material of this invention may be carried out alone or in conjunction with other therapies including, e.g., surgery, checkpoint blockade, chemotherapy, and/or in conjunction with other transgenic T cells.

Example 1: Identification of TCR Candidates that Bind the DNAJB1-PRKACA Fusion Protein Neopitope-specific TCRs were identified by stimulating tumor-infiltrating lymphocytes (TILs) from a first patient (P94), tumor cells from a second patient (B2) and TILs expanded from ascites from a third patient (Y6G) with the fusion-spanning peptides and assessing IFNγ expression using single-cell transcriptomics. Clonally expanded TCRs that were associated with high IFNγ expression in response to this peptide were obtained. TCRs were identified and alpha and beta chain variable regions were determined (Tables 1 and 2, respectively). In addition, specificity of the TCRs to the FLC fusion was assessed.

TABLE 1

| Clonotype ID | CDR3a | SEQ ID NO: | TRAV | TRAJ |
|---|---|---|---|---|
| P9R-1 | CALSEAEDSGGSNYKLTF | 8 | 19*01 | 53*01 |
| P9R-4* | CALDMFSGGYNKLIF | 3 | 16*01 | 4*01 |
| B2-1 | CAEGLLSGNTPLVF | 9 | 5*01 | 29*01 |
| B2-2 | CAVNILGNKLVF | 10 | 12-2*01 | 47*02 |
| B2-73 | CAVIMDSNYQLIW | 11 | 20*01 | 33*01 |
| Y6G-1 | CASLGVTGGGNKLTF | 12 | 12-2*01 | 10*01 |
| Y6G-2 | CAAHTGTASKLTF | 13 | 35*01 | 44*01 |
| Y6G-3 | CAVSDDYGGSQGNLIF | 14 | 8-4*01 | 42*01 |
| Y6G-4 | CAVSRRPGGGNTPLVF | 15 | 1-1*01 | 29*01 |
| Y6G-5 | CAVPGNNKFYF | 16 | 2*01 | 21*01 |

*JCC209 FLC_TIL4 clonotype 4.

TABLE 2

| Clonotype ID | CDR3b | SEQ ID NO: | TRBV | TRBJ |
|---|---|---|---|---|
| P9R-1 | CASSFLGSTDTQYF | 17 | 7-3*01 | 2-3*01 |
| P9R-4* | CATSRVKTSGGYEQYF | 4 | 15*01 | 2-7*01 |
| B2-1 | CASSPGQGSRTEAFF | 18 | 13*01 | 1-1*01 |
| B2-2 | CASSQEGGRLVGTQYF | 19 | 4-1*01 | 2-3*01 |
| B2-73 | CASSLSLGGRGPDTQYF | 20 | 27*01 | 2-3*01 |
| Y6G-1 | CASSQDGAGQGYTF | 21 | 4-3*01 | 1-2*01 |
| Y6G-2 | CASNPLGGNQPQHF | 22 | 19*01 | 1-5*01 |
| Y6G-3 | CASSQEVRMNTEAFF | 23 | 4-1*01 | 1-1*01 |
| Y6G-4 | CSAKTTGEVPYEQYF | 24 | 20-1*01 | 2-7*01 |
| Y6G-5 | CASSANPTDPVILRYGYTF | 25 | 9*01 | 1-2*01 |

*JCC209 FLC_TIL4 clonotype 4.

What is claimed is:

1. A vector harboring nucleic acids encoding a recombinant T cell receptor having antigenic specificity for a DnaJ heat shock protein family member B1-protein kinase CAMP-activated catalytic subunit alpha (DNAJB1-PRKACA) fusion protein, wherein the T cell receptor comprises (i) an α chain variable region comprising the amino acid sequence CALDMESGGYNKLIF (SEQ ID NO:3), CALSEAEDSGGSNYKLTF (SEQ ID NO:8), CAEGLLSGNTPLVE (SEQ ID NO:9), CAVNILGNKLVE (SEQ ID NO:10), CAVIMDSNYQLIW (SEQ ID NO:11), CASLGVTGGGNKLTF (SEQ ID NO:12), CAAHTGTASKLTF (SEQ ID NO:13), CAVSDDYGGSQGNLIF (SEQ ID NO:14), CAVSRRPGGGNTPLVF (SEQ ID NO:15), or CAVPGNNKFYF (SEQ ID NO:16);

(ii) a β chain variable region comprising the amino acid sequence CATSRVKTSGGYEQYF (SEQ ID NO:4), CASSELGSTDTOYF (SEQ ID NO:17), CASSPGOGSRTEAFF (SEQ ID NO:18), CASSQEGGRLVGTQYF (SEQ ID NO:19), CASSLSLGGRGPDTQYF (SEQ ID NO:20), CASSQDGAGQGYTF (SEQ ID NO:21), CASNPLGGNQPQHF (SEQ ID NO:22), CASSQEVRMNTEAFF (SEQ ID NO:23), CSAKTTGEVPYEQYF (SEQ ID NO:24), or CASSANPTDPVILRYGYTF (SEQ ID NO:25); or (iii) both (i) and (ii).

2. The vector of claim 1, wherein the T cell receptor binds amino acid residues EIFDRYGEEV (SEQ ID NO:2) of the DNAJB1-PRKACA fusion protein.

3. The vector of claim 1, wherein said vector is an expression vector.

4. A host cell comprising the vector of claim 1.

5. The host cell of claim 4, wherein said cell is a T cell.

6. A population of cells comprising a host cell of claim 5.

7. A pharmaceutical composition claim 1 and a pharmaceutically comprising the vector of acceptable carrier.

* * * * *

SEQUENCE LISTING

```
<160> NUMBER OF SEQ ID NOS: 25

<210> SEQ ID NO 1
<211> LENGTH: 406
<212> TYPE: PRT
<213> ORGANISM: Homo sapiens

<400> SEQUENCE: 1

Met Gly Lys Asp Tyr Tyr Gln Thr Leu Gly Leu Ala Arg Gly Ala Ser
1               5                   10                  15

Asp Glu Glu Ile Lys Arg Ala Tyr Arg Arg Gln Ala Leu Arg Tyr His
            20                  25                  30

Pro Asp Lys Asn Lys Glu Pro Gly Ala Glu Glu Lys Phe Lys Glu Ile
        35                  40                  45

Ala Glu Ala Tyr Asp Val Leu Ser Asp Pro Arg Lys Arg Glu Ile Phe
    50                  55                  60
```

Asp Arg Tyr Gly Glu Glu Val Lys Glu Phe Leu Ala Lys Ala Lys Glu
65 70 75 80

Asp Phe Leu Lys Lys Trp Glu Ser Pro Ala Gln Asn Thr Ala His Leu
85 90 95

Asp Gln Phe Glu Arg Ile Lys Thr Leu Gly Thr Gly Ser Phe Gly Arg
100 105 110

Val Met Leu Val Lys His Lys Glu Thr Gly Asn His Tyr Ala Met Lys
115 120 125

Ile Leu Asp Lys Gln Lys Val Val Lys Leu Lys Gln Ile Glu His Thr
130 135 140

Leu Asn Glu Lys Arg Ile Leu Gln Ala Val Asn Phe Pro Phe Leu Val
145 150 155 160

Lys Leu Glu Phe Ser Phe Lys Asp Asn Ser Asn Leu Tyr Met Val Met
165 170 175

Glu Tyr Val Pro Gly Gly Glu Met Phe Ser His Leu Arg Arg Ile Gly
180 185 190

Arg Phe Ser Glu Pro His Ala Arg Phe Tyr Ala Ala Gln Ile Val Leu
195 200 205

Thr Phe Glu Tyr Leu His Ser Leu Asp Leu Ile Tyr Arg Asp Leu Lys
210 215 220

Pro Glu Asn Leu Leu Ile Asp Gln Gln Gly Tyr Ile Gln Val Thr Asp
225 230 235 240

Phe Gly Phe Ala Lys Arg Val Lys Gly Arg Thr Trp Thr Leu Cys Gly
245 250 255

Thr Pro Glu Tyr Leu Ala Pro Glu Ile Ile Leu Ser Lys Gly Tyr Asn
260 265 270

Lys Ala Val Asp Trp Trp Ala Leu Gly Val Leu Ile Tyr Glu Met Ala
275 280 285

Ala Gly Tyr Pro Pro Phe Phe Ala Asp Gln Pro Ile Gln Ile Tyr Glu
290 295 300

Lys Ile Val Ser Gly Lys Val Arg Phe Pro Ser His Phe Ser Ser Asp
305 310 315 320

Leu Lys Asp Leu Leu Arg Asn Leu Leu Gln Val Asp Leu Thr Lys Arg
325 330 335

Phe Gly Asn Leu Lys Asn Gly Val Asn Asp Ile Lys Asn His Lys Trp
340 345 350

Phe Ala Thr Thr Asp Trp Ile Ala Ile Tyr Gln Arg Lys Val Glu Ala
355 360 365

Pro Phe Ile Pro Lys Phe Lys Gly Pro Gly Asp Thr Ser Asn Phe Asp
370 375 380

Asp Tyr Glu Glu Glu Glu Ile Arg Val Ser Ile Asn Glu Lys Cys Gly
385 390 395 400

Lys Glu Phe Ser Glu Phe
405

<210> SEQ ID NO 2
<211> LENGTH: 10
<212> TYPE: PRT
<213> ORGANISM: Artificial sequence
<220> FEATURE:
<223> OTHER INFORMATION: Synthetic peptide

<400> SEQUENCE: 2

Glu Ile Phe Asp Arg Tyr Gly Glu Glu Val
1 5 10

<210> SEQ ID NO 3
<211> LENGTH: 15
<212> TYPE: PRT
<213> ORGANISM: Artificial sequence
<220> FEATURE:
<223> OTHER INFORMATION: Synthetic peptide

<400> SEQUENCE: 3

Cys Ala Leu Asp Met Phe Ser Gly Gly Tyr Asn Lys Leu Ile Phe
1 5 10 15

<210> SEQ ID NO 4
<211> LENGTH: 16
<212> TYPE: PRT
<213> ORGANISM: Artificial sequence
<220> FEATURE:
<223> OTHER INFORMATION: Synthetic peptide

<400> SEQUENCE: 4

Cys Ala Thr Ser Arg Val Lys Thr Ser Gly Gly Tyr Glu Gln Tyr Phe
1 5 10 15

<210> SEQ ID NO 5
<211> LENGTH: 21
<212> TYPE: PRT
<213> ORGANISM: Artificial sequence
<220> FEATURE:
<223> OTHER INFORMATION: Synthetic peptide

<400> SEQUENCE: 5

Lys Leu Ser Gly Ser Ala Ser Ala Pro Lys Leu Glu Glu Gly Glu Phe
1 5 10 15

Ser Glu Ala Arg Val
20

<210> SEQ ID NO 6
<211> LENGTH: 27
<212> TYPE: PRT
<213> ORGANISM: Artificial sequence
<220> FEATURE:
<223> OTHER INFORMATION: Synthetic peptide

<400> SEQUENCE: 6

Arg Ala Lys Arg Ser Gly Ser Gly Ala Thr Asn Phe Ser Leu Leu Lys
1 5 10 15

Gln Ala Gly Asp Val Glu Glu Asn Pro Gly Pro
20 25

<210> SEQ ID NO 7
<211> LENGTH: 16
<212> TYPE: PRT
<213> ORGANISM: Artificial sequence
<220> FEATURE:
<223> OTHER INFORMATION: Synthetic peptide

<400> SEQUENCE: 7

Gly Ser Ala Asp Asp Ala Lys Lys Asp Ala Ala Lys Lys Asp Gly Lys
1 5 10 15

<210> SEQ ID NO 8
<211> LENGTH: 18
<212> TYPE: PRT
<213> ORGANISM: Artificial sequence
<220> FEATURE:
<223> OTHER INFORMATION: Synthetic peptide

<400> SEQUENCE: 8

Cys Ala Leu Ser Glu Ala Glu Asp Ser Gly Gly Ser Asn Tyr Lys Leu
1               5                   10                  15

Thr Phe

<210> SEQ ID NO 9
<211> LENGTH: 14
<212> TYPE: PRT
<213> ORGANISM: Artificial sequence
<220> FEATURE:
<223> OTHER INFORMATION: Synthetic peptide

<400> SEQUENCE: 9

Cys Ala Glu Gly Leu Leu Ser Gly Asn Thr Pro Leu Val Phe
1               5                   10

<210> SEQ ID NO 10
<211> LENGTH: 12
<212> TYPE: PRT
<213> ORGANISM: Artificial sequence
<220> FEATURE:
<223> OTHER INFORMATION: Synthetic peptide

<400> SEQUENCE: 10

Cys Ala Val Asn Ile Leu Gly Asn Lys Leu Val Phe
1               5                   10

<210> SEQ ID NO 11
<211> LENGTH: 13
<212> TYPE: PRT
<213> ORGANISM: Artificial sequence
<220> FEATURE:
<223> OTHER INFORMATION: Synthetic peptide

<400> SEQUENCE: 11

Cys Ala Val Ile Met Asp Ser Asn Tyr Gln Leu Ile Trp
1               5                   10

<210> SEQ ID NO 12
<211> LENGTH: 15
<212> TYPE: PRT
<213> ORGANISM: Artificial sequence
<220> FEATURE:
<223> OTHER INFORMATION: Synthetic peptide

<400> SEQUENCE: 12

Cys Ala Ser Leu Gly Val Thr Gly Gly Gly Asn Lys Leu Thr Phe
1               5                   10                  15

<210> SEQ ID NO 13
<211> LENGTH: 13
<212> TYPE: PRT
<213> ORGANISM: Artificial sequence
<220> FEATURE:
<223> OTHER INFORMATION: Synthetic peptide

<400> SEQUENCE: 13

Cys Ala Ala His Thr Gly Thr Ala Ser Lys Leu Thr Phe
1               5                   10

<210> SEQ ID NO 14
<211> LENGTH: 16
<212> TYPE: PRT
<213> ORGANISM: Artificial sequence
<220> FEATURE:

<223> OTHER INFORMATION: Synthetic peptide

<400> SEQUENCE: 14

Cys Ala Val Ser Asp Asp Tyr Gly Gly Ser Gln Gly Asn Leu Ile Phe
1 5 10 15

<210> SEQ ID NO 15
<211> LENGTH: 16
<212> TYPE: PRT
<213> ORGANISM: Artificial sequence
<220> FEATURE:
<223> OTHER INFORMATION: Synthetic peptide

<400> SEQUENCE: 15

Cys Ala Val Ser Arg Arg Pro Gly Gly Gly Asn Thr Pro Leu Val Phe
1 5 10 15

<210> SEQ ID NO 16
<211> LENGTH: 11
<212> TYPE: PRT
<213> ORGANISM: Artificial sequence
<220> FEATURE:
<223> OTHER INFORMATION: Synthetic peptide

<400> SEQUENCE: 16

Cys Ala Val Pro Gly Asn Asn Lys Phe Tyr Phe
1 5 10

<210> SEQ ID NO 17
<211> LENGTH: 14
<212> TYPE: PRT
<213> ORGANISM: Artificial sequence
<220> FEATURE:
<223> OTHER INFORMATION: Synthetic peptide

<400> SEQUENCE: 17

Cys Ala Ser Ser Phe Leu Gly Ser Thr Asp Thr Gln Tyr Phe
1 5 10

<210> SEQ ID NO 18
<211> LENGTH: 15
<212> TYPE: PRT
<213> ORGANISM: Artificial sequence
<220> FEATURE:
<223> OTHER INFORMATION: Synthetic peptide

<400> SEQUENCE: 18

Cys Ala Ser Ser Pro Gly Gln Gly Ser Arg Thr Glu Ala Phe Phe
1 5 10 15

<210> SEQ ID NO 19
<211> LENGTH: 16
<212> TYPE: PRT
<213> ORGANISM: Artificial sequence
<220> FEATURE:
<223> OTHER INFORMATION: Synthetic peptide

<400> SEQUENCE: 19

Cys Ala Ser Ser Gln Glu Gly Gly Arg Leu Val Gly Thr Gln Tyr Phe
1 5 10 15

<210> SEQ ID NO 20
<211> LENGTH: 17
<212> TYPE: PRT
<213> ORGANISM: Artificial sequence
<220> FEATURE:
<223> OTHER INFORMATION: Synthetic peptide

<400> SEQUENCE: 20

Cys Ala Ser Ser Leu Ser Leu Gly Gly Arg Gly Pro Asp Thr Gln Tyr
1 5 10 15

Phe

<210> SEQ ID NO 21
<211> LENGTH: 14
<212> TYPE: PRT
<213> ORGANISM: Artificial sequence
<220> FEATURE:
<223> OTHER INFORMATION: Synthetic peptide

<400> SEQUENCE: 21

Cys Ala Ser Ser Gln Asp Gly Ala Gly Gln Gly Tyr Thr Phe
1 5 10

<210> SEQ ID NO 22
<211> LENGTH: 14
<212> TYPE: PRT
<213> ORGANISM: Artificial sequence
<220> FEATURE:
<223> OTHER INFORMATION: Synthetic peptide

<400> SEQUENCE: 22

Cys Ala Ser Asn Pro Leu Gly Gly Asn Gln Pro Gln His Phe
1 5 10

<210> SEQ ID NO 23
<211> LENGTH: 15
<212> TYPE: PRT
<213> ORGANISM: Artificial sequence
<220> FEATURE:
<223> OTHER INFORMATION: Synthetic peptide

<400> SEQUENCE: 23

Cys Ala Ser Ser Gln Glu Val Arg Met Asn Thr Glu Ala Phe Phe
1 5 10 15

<210> SEQ ID NO 24
<211> LENGTH: 15
<212> TYPE: PRT
<213> ORGANISM: Artificial sequence
<220> FEATURE:
<223> OTHER INFORMATION: Synthetic peptide

<400> SEQUENCE: 24

Cys Ser Ala Lys Thr Thr Gly Glu Val Pro Tyr Glu Gln Tyr Phe
1 5 10 15

<210> SEQ ID NO 25
<211> LENGTH: 19
<212> TYPE: PRT
<213> ORGANISM: Artificial sequence
<220> FEATURE:
<223> OTHER INFORMATION: Synthetic peptide

<400> SEQUENCE: 25

Cys Ala Ser Ser Ala Asn Pro Thr Asp Pro Val Ile Leu Arg Tyr Gly
1 5 10 15

Tyr Thr Phe